Aug. 15, 1950  M. B. CHERN  2,518,664
ASTROLOGICAL CHART
Filed Jan. 2, 1948  5 Sheets-Sheet 1
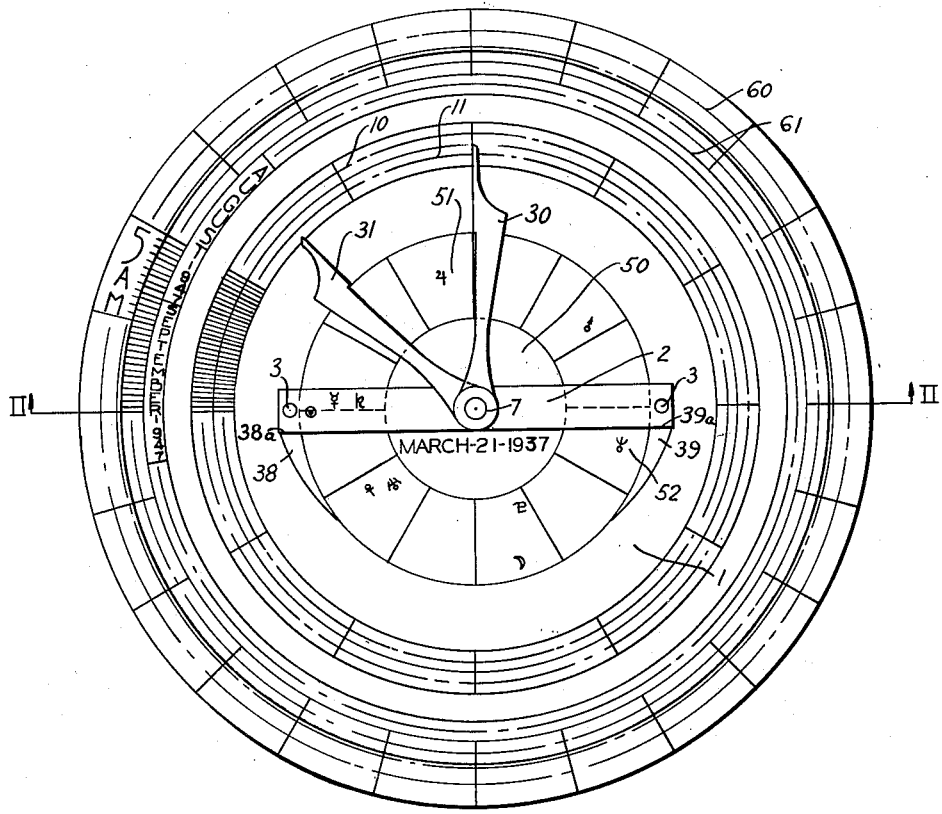
FIG-1
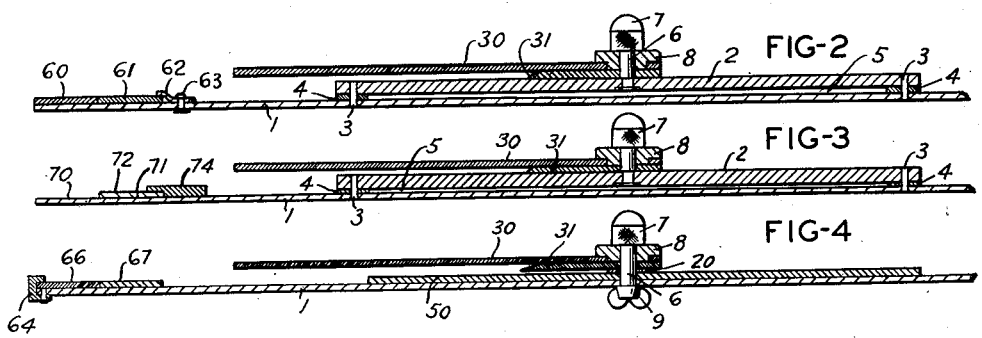
FIG-2
FIG-3
FIG-4
INVENTOR.
MARGARET BOOTH CHERN
BY
HER ATTORNEYS.

Aug. 15, 1950  M. B. CHERN  2,518,664
ASTROLOGICAL CHART
Filed Jan. 2, 1948  5 Sheets-Sheet 2

INVENTOR.
MARGARET BOOTH CHERN
BY
*Campbell, Brumbaugh & Free*
HER ATTORNEYS.

Aug. 15, 1950     M. B. CHERN     2,518,664
ASTROLOGICAL CHART

Filed Jan. 2, 1948     5 Sheets-Sheet 3

INVENTOR.
MARGARET BOOTH CHERN
BY
HER ATTORNEYS.

Aug. 15, 1950 M. B. CHERN 2,518,664
ASTROLOGICAL CHART
Filed Jan. 2, 1948 5 Sheets-Sheet 4
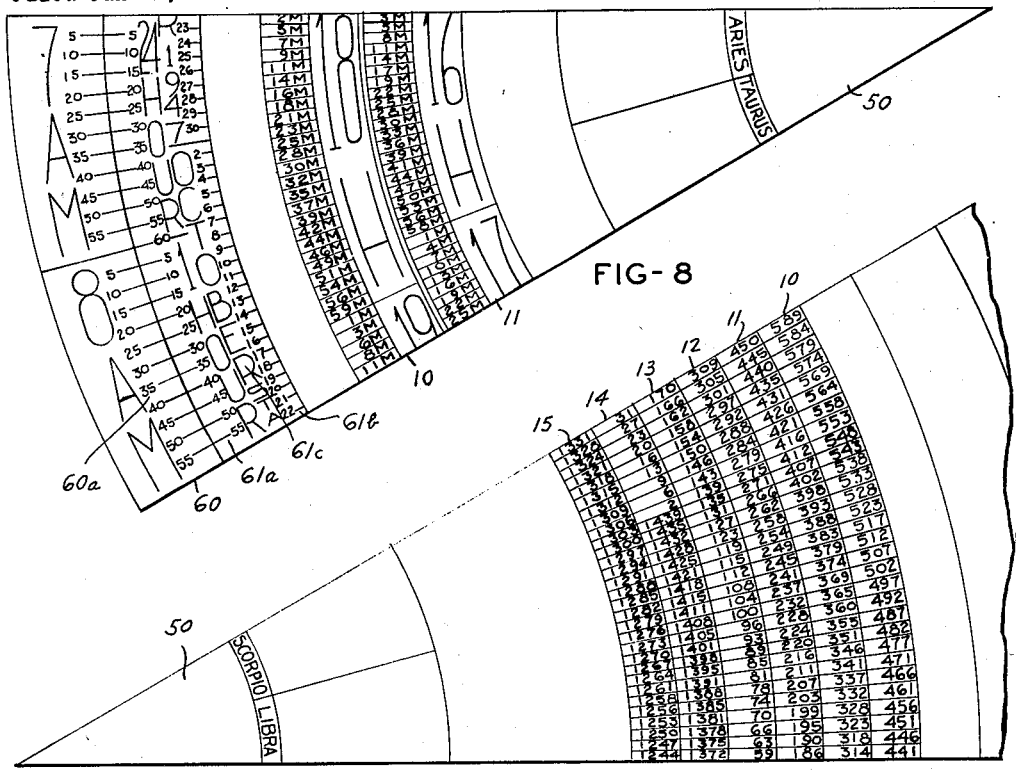
FIG-8
FIG-9
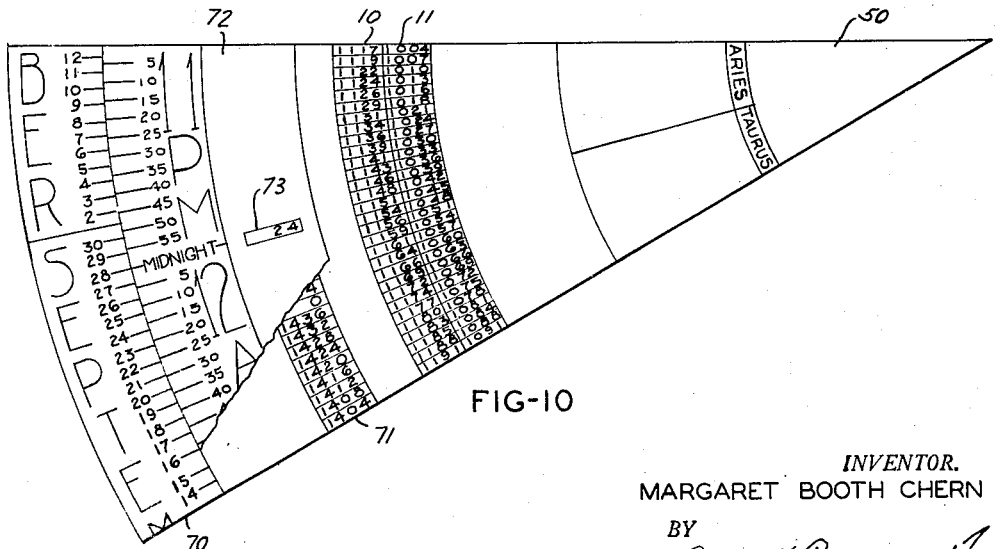
FIG-10
INVENTOR.
MARGARET BOOTH CHERN
BY
*Campbell Brumbaugh Free*
HER ATTORNEYS.

Aug. 15, 1950 M. B. CHERN 2,518,664
ASTROLOGICAL CHART

Filed Jan. 2, 1948 5 Sheets-Sheet 5

INVENTOR.
MARGARET BOOTH CHERN
BY
*Campbell, Brumbaugh Free*
HER ATTORNEYS.

Patented Aug. 15, 1950

2,518,664

UNITED STATES PATENT OFFICE 2,518,664

ASTROLOGICAL CHART

Margaret Booth Chern, New York, N. Y.

Application January 2, 1948, Serial No. 45

14 Claims. (Cl. 35—44)

This invention relates to astrological charts which are useful in determining the relationship of the heavenly bodies to specific heavenly positions at different times and in relation to different points on the earth. More particularly this invention is a mechanical calculating device for instantaneous determination of the horizon or horizon and semi-nocturnal and semi-diurnal arcs therefrom and/or of divisions of said arcs at a specific latitude, in order to establish the house divisions of an astrological chart, and for instantaneous conversion of clock time of a specific calendar day to sidereal time.

It is thought by many that the relationship of the planets and other heavenly bodies to a person or place at some fixed time or at different times, such as the time of a person's birth or the time of some other occurrence which may take place in his life, has an effect upon that person or upon the event. Astrology has a long historical past and has been held in high esteem in Chaldea, China, India, and Greece, to mention some of the ancient cultures, and has been the subject of vast literatures published in almost all languages. It has been recognized as a field of thought which has interested the minds of many great men, such as Claudius, Ptolemy, Tycho Brahe, Roger Bacon, Flamsteed, Kepler, Newton, Archbishop Whately of Dublin, and Henry Ward Beecher, to mention a few.

At the outset, I emphasize that my invention is not concerned with any interpretation or any meaning to be attached to the relation of the heavenly bodies to any individual or any event; it is concerned only with the easy determination of certain factors of an astrological chart or horoscope. The plotting of the relative positions and relations of heavenly bodies at different times and places, i. e., the casting of the horoscope, is an exact science and the use of my invention in this respect therefore, is not dependent upon anything which is not mathematically ascertainable and provable. My invention is not dependent in any way upon the significance to be attributed to any relationship after it is determined.

In addition to its use in the practice of astrology my invention can be used as an educational device to instruct regarding sidereal time and its determination, and certain phases of the various planetary movements. Since these are dependent upon location, the use of my device instructs in the effect of latitude and longitude on relations of the heavenly bodies, in particular the relative positions of the Sun and the Earth, makes familiar the latitude of various cities of the world, and in general develops an understanding of the mathematical orderliness of the solar system.

Heretofore, in determining the zodiacal degrees on the cusps of astrological houses in a horoscope, as can be done readily using my invention, it has been necessary to determine the sidereal time for the day and year under consideration, by referring to an almanac, ephemeris, or similar astronomical table. To this is added the clock time for the minute in question, with an additional twelve hours if the clock time is p. m. If the total is more than 24 hours, 24 is subtracted from the total. A further operation may be necessary if the astronomical table gives the sidereal time for noon of each day, instead of midnight, as is often the case; in this event it is necessary to subtract the clock time from 12 and then add the result to the sidereal time given. Then reference is made to a table of astrological houses for the latitude in which the chart is being cast. From the specific latitude table, by using the sidereal time as above found, the zodiacal signs and degrees of the house cusps can be found and the horoscope inscribed accordingly. All of this may be confusing to a person unfamiliar with astrological symbols and practice, or not experienced in using such tables. Also this present method requires having reference books handy.

In accordance with my invention, all of such calculations and reference books are eliminated and it is possible to make all of these determinations readily, or any part of them, by means of the invention.

My invention will be better understood when taken in connection with all of the drawings which are a part hereof and in which:

Fig. 1 is a plan view of a complete device made in accordance with the invention;

Fig. 2 is a cross-section taken from lines II—II, Fig. 1;

Fig. 3 is a view somewhat similar to Fig. 2, except that it shows a modification of the outer peripheral positions used for determining sidereal time;

Fig. 4 is a view similar to Fig. 2 except that the center construction shows a modified form;

Fig. 8 is a segment of a view in which the outer two peripheral circles can be used to convert clock time to sidereal time. The intermediate circles represent the sidereal time used for determining the cusps of the first two astrological houses and the inner portion is a part of the horoscope shown in Fig. 7;

Fig. 9 shows a segment at the left or central portion of which is a part of the horoscope shown in Fig. 7 and to the right the intermediate circles represent the sidereal time in six annular circles computed to determine the zodiacal position of the twelve astrological houses;

Fig. 10 is a segment of a modification of the device in which the outer portion is a modified construction for converting clock time to sidereal time, and the intermediate portion gives sidereal time for determining the cusps of the first two astrological houses expressed only in minutes of the day.

Figure 6:
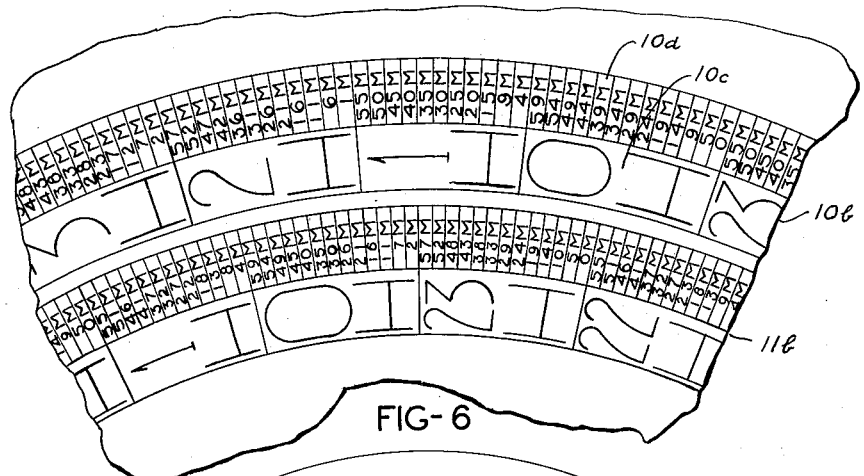
Fig. 6 is an enlarged segment of a portion of the concentric rings shown more or less diagrammatically in Fig. 5.

Referring at first to a general description of the device of my invention, as shown more particularly in Fig. 1, it comprises at least one annular area 10, which contains the sidereal time calculated for any particular degree of latitude for the astrological ascendant, the preferred embodiment having two such annular areas for the first astrological house, 10 and 11. This is shown in more detail in Figs. 5 and 6 at 10a, 11a and 10b and 11b, as will be described later in greater detail. Rotatably mounted in the center (Fig. 1) are two hands 30 and 31. Hand 30 points to the sidereal time inscribed in the annular section 10 for determining the astrological ascendant, and hand 31 points to the sidereal time inscribed in the annular section 11 for determining the cusp of the second astrological house. The hands may be mounted in any way to move to different radial positions, such as on the periphery of a movable hoop.

In the center of the device a horoscope 50 can be inscribed or placed. The horoscope contains the positions of the planets for some particular time. In the illustrative example, shown in Fig. 1 and more particularly in Fig. 7, the particular time is March 21, 1937. For example, the position of Jupiter is shown at 51. Other planets are shown, such as Neptune at 52.

In using the device, some particular time is selected, such as the minute, hour (clock time), day, and month of the year when the device is used, and this is then converted to sidereal time. This can be done by calculation if desired or in accordance with the invention, as will be explained later. If December 1, 1947 at 8:55 a. m. is selected, the sidereal time will be found to be 13 hours and 30 minutes. The hand 30 is then moved so as to point to the sidereal time in the first table of astrological houses in the annular area 10. If the device has two hands, the hand 31 is set to point at this sidereal time in the second astrological house, as shown in the annular area 11. As will be seen hereinafter in connection with the drawings set up for 41° N. latitude, the position of the hands 30 and 31 will invariably form an arc of less than 90°. This arc will usually embrace the positions of certain of the heavenly bodies, depending on their position on the horoscope which in turn depends on the date and time. In some cases the hands may not embrace any of the heavenly bodies. In this particular instance, illustrated in Fig. 1, Jupiter is enclosed by the hands, as shown at 51. Two partial discs, such as half discs, may be used instead of hands and moved so that a section of the horoscope is left uncovered by the discs. The discs, as well as pointers and other indicators, are regarded as equivalent of the hands. When one hand is used the heavenly body nearest the hand is noted. From this determination of Jupiter as the controlling planet, astrologers are able to make certain determinations. As has been explained heretofore, the significance or the interpretation is not a part of the invention.

With this general explanation of the general construction of the invention and the mode of use, further explanation will now be given to the various parts and details of the device.

The chart of the invention comprises a base 1, preferably circular in form, although there is no objection to its being square or shaped in any other manner. It may be formed of cardboard, plastic, or other rigid material. Sheet aluminum has been found highly desirable. The hands 30 and 31 are mounted near the center of the base 1 so as to be rotatable. Any suitable means may be employed for mounting the hands 30 and 31 in this manner. Figs. 2 and 3 show a preferred embodiment in which a cross-bar 2 is mounted above the base plate 1. The cross-bar is secured to the base plate 1 by means of a rivet 3, or other similar fastening material. In this embodiment the cross-bar 2 is spaced from the base plate 1 by means of spacers 4 to provide a space 5 between the base plate 1 and the cross-bar 2. The hands 30 and 31 are rotatably mounted on the cross-bar 2 by means of a shaft 6. The hands are mounted one above the other and it is immaterial which hand is on top, but preferably the longer hand is placed on top for convenience of use. Knurled members 7 and 8 may be mounted on the hands so as to be rotatable thereby.

In an alternative embodiment shown in Fig. 4, the base plate 1 has a hole formed in it at the center and the shaft 6 extends through the base plate and the hands are secured on the shaft 6 by means of a cooperating thumb nut 9.

It will be obvious that various constructions can be employed for securing the hands at the center of the device so that they can be rotated. Preferably the mounting is such that the hands are held in position by friction, but can be moved to various positions by a gentle pressure.

Figure 7:
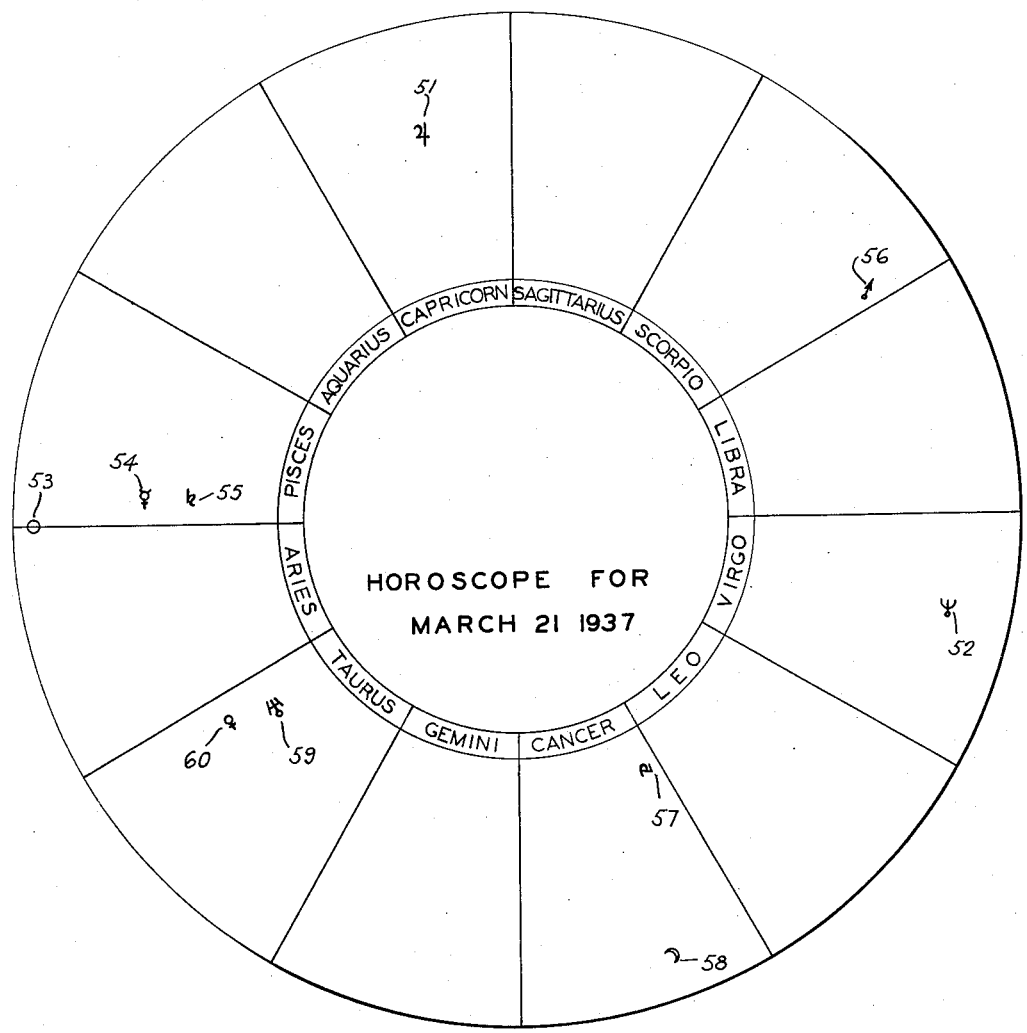
Fig. 7 is a view of the horoscope which is placed in the center of the device as shown in Fig. 1, and in which the positions of the heavenly bodies are shown as of March 21, 1937.

The horoscope 50, which is shown in the center, is illustrated more particularly in Fig. 7. The horoscope is divided into the twelve astrological sections of 30° each, and may be marked by the twelve astrological signs Aries, Taurus, Gemini, Cancer, Leo, Virgo, Libra, Scorpio, Sagittarius, Capricorn, Aquarius and Pisces. On the horoscope are noted the positions of the ten heavenly bodies used by astrologers more particularly, the Sun 53, Mercury 54, Saturn 55, Jupiter 51, Mars 56, Neptune 52, Pluto 57, Moon 58, Uranus 59 and Venus 60. In the illustrative embodiment shown in Fig. 7 the heavenly bodies are positioned as of March 21, 1937, that is, on that date the Sun is shown at the center-left with 0° of Aries. The position of all the other heavenly bodies on that date is readily determined by an astronomer or astrologer from astronomical tables. It will be understood that for other dates the relative positions of the ten heavenly bodies will be different.

The horoscope 50 is adapted to be mounted in the center of the device, such as shown in Fig. 1. This can be accomplished in various ways. In Figs. 1, 2 and 3, a preferred embodiment is illustrated in which the horoscope is removably mounted. In this case the horoscope is inscribed on a piece of cardboard, plastic, metal, or other sheet material and is formed with two extending parts 38 and 39. The horoscope 50 is then slid into the space 5 between the base 1 and the cross-bar 2 and the edges 38a and 39a of the extensions abut the cross-bar 2. In this way the horoscope is stopped from sliding beyond the correct position and will be held in the proper position relative to the sidereal time noted in the annular areas 10 and 11. In this way the horoscope 50 is mechanically indexed. This embodiment also permits the device to be used with horoscopes for different days. For instance, the horoscope shown in Figs. 1 and 7 can be used only with reference to March 21, 1937. Since in most instances the date selected is the date of birth of the person using that device, only one horoscope would be needed for use by the person born on March 21, 1937. However, if the device were to be used by a person born on some other day, such as February 21, 1938, a horoscope having the same structure but having the positions of the heavenly bodies inscribed in the positions for February 21, 1938 may be similarly inserted in the space 5. In this way the entire device can be manufactured in quantity production, except for the horoscope 50, and these can be individually prepared for different days and inserted in the space 5.

In the alternative embodiment shown in Fig. 4, the horoscope 50 is formed with a hole through the center and fastened to the base 1 by means of the shaft 6 which holds the hands. In this embodiment a collar 20 may separate the lower hand 31 from the horoscope 50. Any other suitable means may be employed for holding the horoscope 50 in fixed position on the base.

In still a further embodiment, for use in cases where the device is to be used only with a horoscope for one date, the positions of the heavenly bodies may be inscribed directly on the base 1.

Other constructions will be apparent whereby the positions of the heavenly bodies may be fixedly or removably mounted in the central portion of the device so that the positions of the heavenly bodies can be enclosed by the hands 30 and 31.

Reference is now made to the annular areas 10 and 11, which contain the sidereal time to which the hands 30 and 31 point.

Sidereal time, often called star time, is time uniformly measured by the axial rotation of the earth as referred to a star. A sidereal day has 23 hours, 56 minutes, 4.09 seconds of mean solar (clock) time and is divided into 24 sidereal hours, and 60 sidereal minutes for each hour. Thus a sidereal minute is a different length of time than a clock minute. Sidereal time is well known to and used by navigators.

Figure 5:
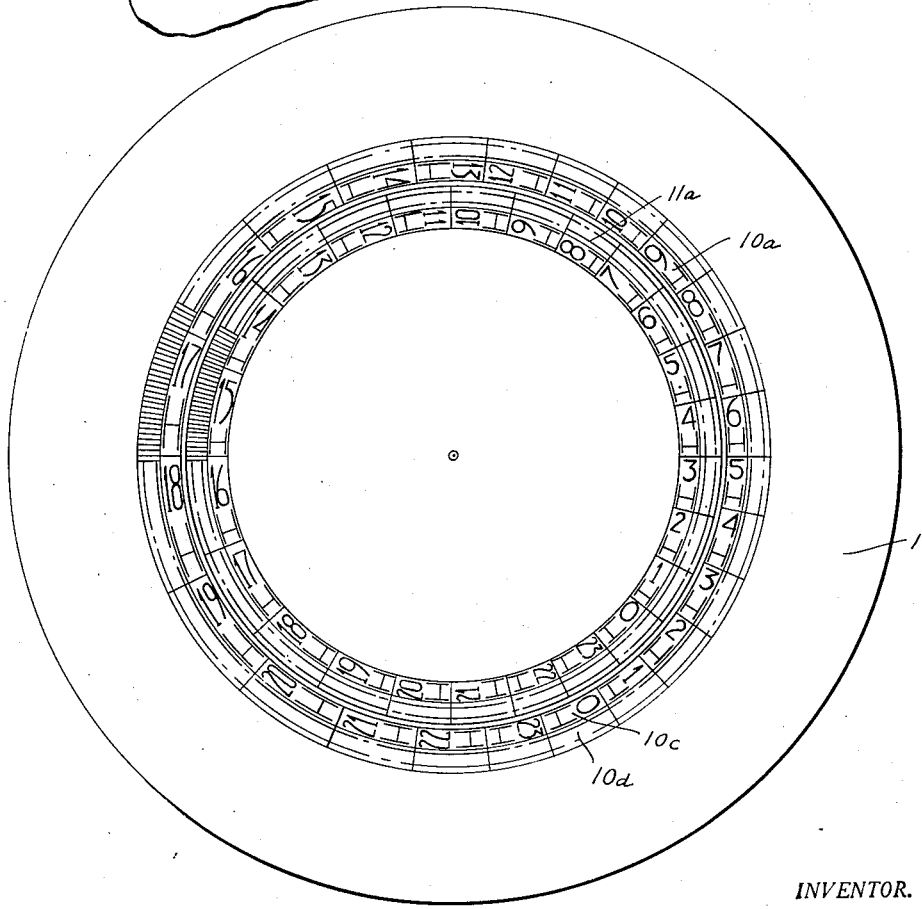
Fig. 5 is a plan view of two concentric rings showing sidereal time for determining the cusps of the first two astrological houses.

In Fig. 5 it will be seen that the sidereal time is comprised of 24 sections, representing the twenty-four sidereal hours of the day, and are shown from 0 hour through the 23rd hour. Each sidereal hour section is divided into 60 sidereal minutes, as shown in Fig. 6, which is an enlargement of a section of the annular areas in Fig. 5. As will be seen, for example, in the annular section 10b, the 0 sidereal hour is divided in sidereal minute sections. The section for the 0 sidereal hour is shown at 10c and the sidereal minutes within the 0 hour are shown in the area 10d. The sidereal minutes are generally divided into from 3 to 6 minute intervals, although if desired each sidereal minute or subdivision thereof within the sidereal hour could be shown. Generally it is sufficient to show the sidereal minutes in intervals of from 3 to 6 minutes within the hour, since this is sufficiently accurate for most purposes. By interpolation intervals of one minute can be readily estimated.

Each of the two annular areas, 10 and 11, contains the twenty-four sidereal hours, subdivided into 60 sidereal minutes. It will be noted, by a study of Fig. 5, that the spacing for the hours varies, for instance, the 17th sidereal hour in the annular area 10 covers a larger angular segment than the 23rd hour. This is because the sidereal time shown in Fig. 5 is inscribed for erection of horoscopes at 41° N. latitude (New York city). At the Equator the angular segment for each of the sidereal hours would be equal, but in positions north and south of the Equator, the angular segment for each of the hours of sidereal time varies with different positions of latitude. The same is true, for the same reason, in the second annular area 11 where it will be seen that the angular segment covered by the 15th, 16th or 17th sidereal hour is much larger than the angular segment covered by the first or second sidereal hour.

It will also be noted that the sidereal times in the two annular areas 10 and 11 are not the same at any given point. For example, the 17th sidereal hour in the area 10 is in the same angular position as the 15th sidereal hour in area 11. This can be seen more particularly in Fig. 6, for example, where the 2nd sidereal hour in the area 10 is opposite the zero and first sidereal hours in the area 11. The area 11 the same sidereal time as found in area 10 will be shown relatively positioned counterclockwise from 10 and distant one third of the semi-nocturnal arc from the position of said sidereal time in area 10. Thus when a horoscope is centered in the device with 0° Capricorn at the exact meridian and the other signs of the zodiac disposed in their customary order, counterclockwise and each degree of the zodiac equally angular, the sidereal time in area 10 would be adjacent to the degree of the horizon of the horoscope and the same sidereal time in area 11 would be adjacent to the degree of the zodiac one third of the semi-nocturnal arc from the horizon (position of the cusp of the 2nd astrological house). In other words, the inscription in each annular area is the sidereal time for the 24 hours of the day computed and spaced for a specific latitude in relation to the 360° of a circle so that if one area alone is used the sidereal time would be positioned adjacent to the horizon of the astrological zodiac, and if more than one annular area is employed the same sidereal time in each would be angularly disposed from the first by one-third of the semi-nocturnal arc, two-thirds of the semi-nocturnal arc, the semi-diurnal arc, two-thirds of the semi-diurnal arc and one-third of the semi-diurnal arc, therefrom.

It is believed sufficient to say, for the purposes of understanding the device, that each of the annular areas 10 and 11 include twenty-four sidereal hours each subdivided into 60 sidereal minutes; the sidereal hours being of unequal angular segments, except at the equator, and the sidereal hours in one area always being angularly displaced from the hour in another section except in the extreme northern and southern latitudes. Thus when the hand 30 is pointed at 13½ sidereal hours in area 10, it will be in a vertical position. When the hand 31 is pointed at 13½ sidereal hours in area 11 it extends in a southeast direction. (The directional positions according to atrological terminology are the reverse of those customarily used by contemporary cartographers.) It is believed sufficient to say that the same sidereal hour in the two areas 10 and 11 is always displaced from each other by some positive angle which is less than 90° except at the extreme northern and southern latitude, so that the hands 30 and 31, when pointed to the same sidereal time in the respective areas 10 and 11, or the hands for the areas 12, 13, 14 or 15, will form an angle less than 90° when used in most localities.

In the embodiment shown in Figs. 5 and 6, the sidereal time in the areas 10 and 11 is calculated for determining the cusps of the first two astrological houses at 41° N. latitude. If it is desired, these annular areas can be extended to six in number, namely 10, 11, 12, 13, 14 and 15, as shown more particularly in Fig. 9. By reference to this figure it will be seen that the annular areas 10 and 11 contain the sidereal time, but in this embodiment the sidereal time is expressed only in sidereal minutes instead of hours and minutes. Since there are twenty-four sidereal hours times sixty sidereal minutes, there is a total of 1440 sidereal minutes per sidereal day, and it is immaterial whether the sidereal time is expressed in sidereal minutes extending from 0 to 1440 around the area or in sidereal hours and minutes. The sidereal time expressed in minutes for the first two houses is also shown at 10 and 11 in Fig. 10.

If desired the sidereal time for four other areas may be included, such as shown at 12, 13, 14 and 15 in Fig. 9. When this embodiment is employed the device will have six hands each pointing to each of the six annular areas 10 and 15 inclusive. The hands can also be extended an equal distance across the center so as to form twelve angular segments on the horoscope, corresponding to the twelve astrological houses.

When only two annular areas 10 and 11 are used and only two hands 30 and 31, as shown in Fig. 1, it is of course possible to have only one segment, enclosing one or more of the heavenly bodies on the horoscope 50. When the hands are extended in the opposite direction two segments are formed 180° apart. Astrologers attribute certain significance to the heavenly bodies which are embraced within the segment between hands 30 and 31 and another significance to the heavenly bodies enclosed by a segment 180° opposite thereof. When the six annular areas 10 to 15 and six hands are used extending all the way across the horoscope a total of twelve segments is formed. Twelve different significances or interpretations are deduced by astrologers from the heavenly bodies which are enclosed by all of the twelve segments.

For many purposes, however, only the first astrological house is important and therefore only the heavenly bodies falling within the hands 30 and 31 would be used.

The sidereal time is inscribed in the areas 10 to 15 such as by printing or stencilling. Alternatively it may be printed on paper and pasted on, and the exact manner of accomplishing this is immaterial. It may be formed on a section detachably mounted on the base. Thus the areas can be marked for 41° north latitude; and when the device is to be used at 30° north latitude a different a different set of areas can be mounted on the base.

In the description of the invention heretofore it will be seen that it is necessary to convert the clock or solar (Sun) time for any day, month and year to sidereal time, since the sidereal time must be known in order to position the hands 30 and 31. As explained heretofore, this can be determined in accordance with astronomical calculations. However, in accordance with a preferred embodiment of my invention I also include means by which the clock time can be converted to sidereal time. In Figs. 1, 2, 8, 11 and 12 one modification of such conversion means is illustrated.

Referring more particularly to Figs. 1 and 2 it will be seen that mounted on the outer portion of the base plate 1 are two annular shaped flat hoops 60 and 61. The outer hoop 60 preferably is secured to the base plate 1 by means of adhesive, rivets, or any other manner. The inner hoop 61 is movable on the base plate so as to be rotated with reference to the outer hoop 60. In order to hold the inner hoop 61 in sliding and rotating engagement on top of the base plate and adjacent the outer hoop 60, an offset fastener 62 is secured to the base plate by means of a rivet 63. This offset fastener 62 may have an annular shape or it may comprise a plurality of separately spaced fasteners which engage the inner hoop 61 at a plurality of points around its inner circumference. It will be obvious that other means are apparent for holding the hoop 61 in position. It will also be obvious that the fastener 62 is not essential because when the device is operated in a flat position the hoop 61 will lay in correct position. However the fastener is preferred in order to prevent the inner hoop from becoming loose.

Figure 12:
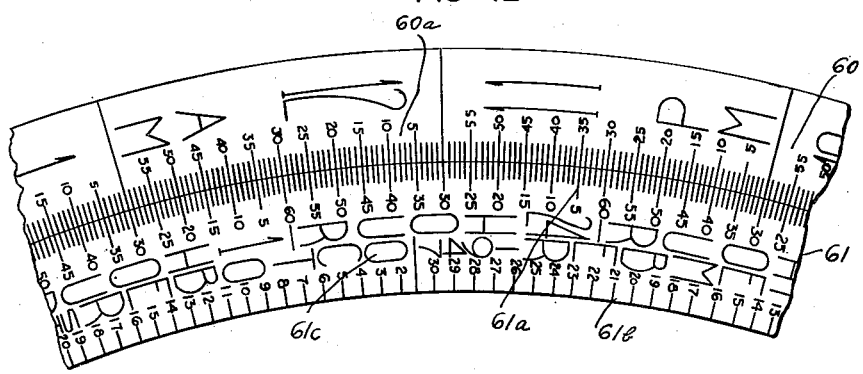
Fig. 12 is an enlarged view of a segment of the areas shown in Fig. 11.
Figure 11:
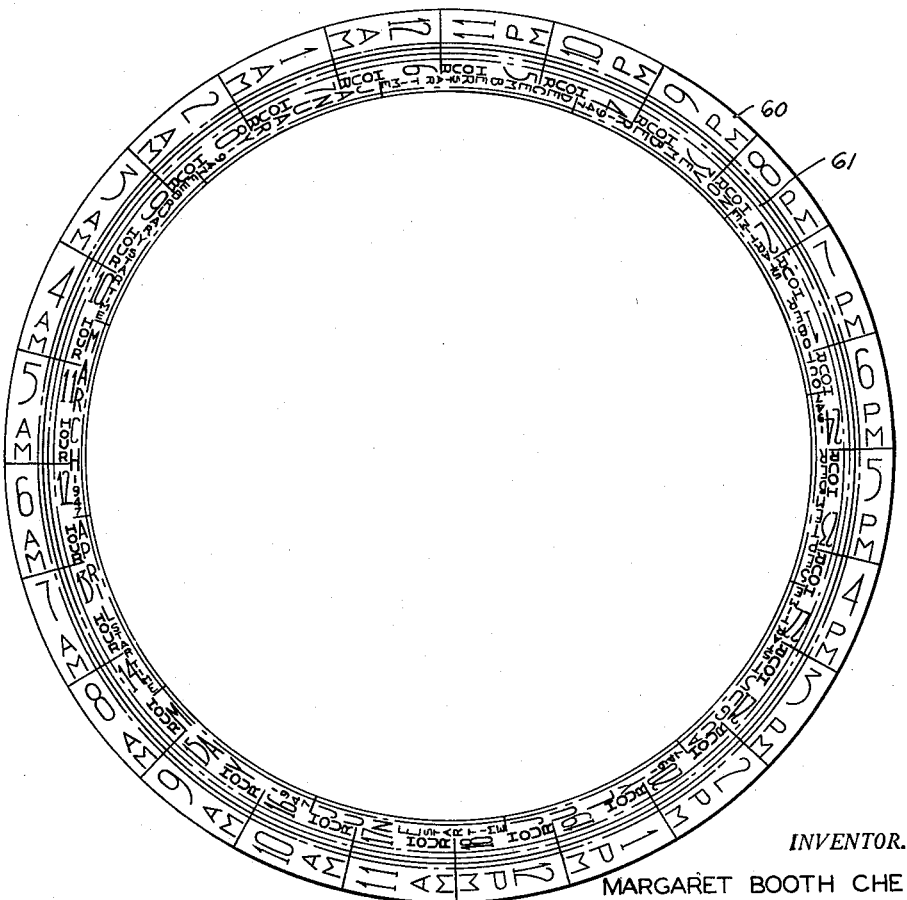
Fig. 11 is a view showing the two peripheral annular areas for converting clock time to sidereal time.

Referring now more particularly to Figs. 11 and 12, it will be seen that the outer hoop 60 is divided into twenty-four equal segments of 15° each, each segment representing one of the twenty-four clock hours of a day. For convenience each clock day is divided into twelve hours in a. m. time and twelve hours in p. m. time, starting with 1 a. m., 2 a. m., around through 12 a. m., then 1 p. m. on to 12 p. m. Each of the clock hour segments is divided into 60 clock minutes, as shown more particularly at 60a in Fig. 12. The subdivisions may be fractions of minutes, minutes, or subdivisions of 5 minutes, depending upon the refinements to which the conversion to sidereal time is desired.

The inner hoop 61 contains two notations. The outer portion of the inner hoop similarly is divided into twenty-four equal segments of 15° each, and each segment is numbered 1 hour of sidereal time, that is, starting at the 1st hour through the 24th hour, as shown in Fig. 11. In some systems sidereal time is numbered from the 0 sidereal hour through and including the 23rd sidereal hour. This depends upon the system of numbering employed, but it is immaterial as long as there are twenty-four segments, each differently identified. (Or the hoop can be subdivided to show 1440 minutes.) Each of the hours of sidereal time on the outer part of the inner hoop 61 is also marked in sidereal minutes, as shown more particularly at 61a, there being 60 sidereal minutes marked for each sidereal hour, or the subdivisions may be every 5 minutes as desired. Thus it will appear, more particularly, by reference to Fig. 12 that the hours and minutes of the clock time in the inner part of the outer hoop 60 are adjacent to the hours and minutes of sidereal time on the outer part of the inner hoop 61. This is also shown in Fig. 8 where the minutes of clock time are listed as each 5 minutes at 60a and the minutes of sidereal time are listed at each 5 minute interval at 61a.

The calendar is inscribed on the inner part of the inner hoop 61. In particular, in Figs. 11 and 12, the inner portion of the inner hoop 61 is divided up into 365 equal segments, corresponding to each of the 365 solar days of the year. These are noted more particularly at 61b. The calendar is also indicated by months, as shown more particularly at 61c. This is preferred in order to divide the year into months and days. If desired, the days of the year can be indicated from 1 to 365.

Referring to Figs. 11 and 12, when it is desired to convert clock or solar time to sidereal time, the particular hour of clock time on some particular day is selected. The inner hoop is rotated so the selected day on the inner portion of the inner hoop (61b—61c) is radially opposite midnight on the outer hoop (60a). By reading the sidereal time (in area 61a) opposite the clock time, the sidereal time is found. When this is used in setting hands, the hand 30 is set opposite this ascertained sidereal time in annular area 10. If the device has only one hand it points to or near a symbol 51, etc., on the horoscope. If the device has two hands, the hand 31, for example, is set opposite this ascertained sidereal time in annular area 11. The hands embrace an arc which may or may not enclose one or more of the symbols 51, 52, etc. on the horoscope 50 (Fig. 1). If the device contains 3, 4, 5 or 6 hands these are similarly pointed to the ascertained sidereal time in areas 12, 13, 14 or 15 and these hands will similarly form arcs.

It will be seen that the sidereal time and the calendar are opposite each other on the same hoop 61. These are always fixed relative to each other, and the clock time movable relative thereto.

Inasmuch as there are not exactly 365 days to each year but rather about 365¼, the inner hoop 61 is calculated for each different year in order to give the correct sidereal time and is replaceable if the greatest accuracy is desired. This is particularly so in the case of leap year when there would be 366 divisions on the inner part of the inner hoop instead of 365. This suggests that the hoop containing the sidereal time and the calendar be placed on the movable inner hoop 61 since this is the most readily replaceable.

However, it is to be understood that the inner hoop could contain the clock time and the outer hoop could contain the calendar and the sidereal time and that either the inner or outer hoop could be fixed. If the outer hoop 66 of Fig. 4 is to contain the calendar and the sidereal time and is to be movable, suitable holding means can be fastened at the edge of the base plate 1 to hold the outer hoop on the base, such as the fastener 64 in Fig. 4. In this modification the inner hoop 67 would be fixed.

Another embodiment of my invention for converting clock time to sidereal time is shown more particularly in connection with Fig. 3 and Fig. 10. This is a preferred embodiment since with it the determination of sidereal time is most easily obtained. In this embodiment the calendar is fixed on the outside, as shown at 70 (Figs. 3 and 10). In the simplest embodiment the calendar will be divided up into twelve months and 365 days and the notations will be inscribed directly on the base plate 1. Spaced from the calendar will be sidereal time in minutes, running from 0 to 1440 covering the 60 sidereal minutes in each of the sidereal 24 hours of the day. The sidereal time also will be inscribed directly on the top of the base plate 1, as shown directly at 71.

The clock time is inscribed on the outer periphery of a movable hoop 72 (Figs. 3 and 10). On the inner portion of the movable hoop an opening 73 is cut, which is positioned so as to expose the sidereal time 71 through the opening 73. The movable hoop 72 containing the clock time can be held in position by a fastener 74 (Fig. 3) which may be an annular form or may be a plurality of individual fasteners.

As in the other embodiments, the sidereal time and the calendar in this embodiment are always fixed with reference to each other. The clock time is movable relative to the calendar and the sidereal time, as is also the case in Figs. 11 and 12. The sidereal time is so positioned that when the clock time on the outer portion of the movable hoop 72 is set opposite any particular day of the year on the fixed outer portion 70, the correct sidereal time would appear in the window 73. In using this form of sidereal time calculator, it is necessary only to revolve the movable hoop 72 until the clock time appears opposite the day and year in question and then to read the sidereal time.

When it is desired to convert clock or solar time to sidereal time, the particular hour of clock time is determined; for instance if this is to be 12:30 a. m. on September 21st, the inner hoop is rotated so that September 21st as noted on the outer hoop extends radially from 12:30 a. m. on the inner hoop (see Fig. 10). By reading the sidereal time that appears in the window 73, it is found that the sidereal time is 24 minutes. When this is to be used in setting the hands 30 and 31, the hand 30 is set opposite the sidereal time of 24 minutes in the annular area 10 and the hand 31 is set opposite to 24 minutes in the annular area 11. The hands enclose the portion of the horoscope 50, as described heretofore. One hand, or 3 to 6 hands, are set opposite the sidereal time in areas 10, 12, 13, 14 or 15 as described heretofore.

It will be obvious that this portion of the invention is also capable of a reverse modification. Thus the sidereal time and the calendar may be on the movable hoop and the clock time may be fixed.

While a preferred embodiment of my invention contemplates means for converting clock time to sidereal time, employing a movable hoop on the outer peripheral portion of the device, it would be obvious that this could be omitted without interfering with the use of the inner portion of the device involving the hands 30 and 31 movable with relation to the horoscope 50 and the sidereal time in the annular areas 10 and 11, or 12, 13, 14 and 15. However, since it is necessary to obtain the sidereal time from clock time in order to be able to set the hands, the combination of the sidereal time converter on the outer portion bears a direct relation to the other elements of the invention.

It is also obvious that the sidereal time calculator can be used independently of the rest of the invention, such as in navigation.

By means of the invention it is therefore possible for any given clock time on any given day of the year, to determine the sidereal time therefrom and knowing the sidereal time to determine the relation thereof to the position of the heavenly bodies at some future or past time, such as time of birth of some individual. Knowing the sidereal time, as is readily ascertainable in accordance with the device, and the position of the heavenly bodies at some given time, astrologers are able to make certain deductions as to influence of heavenly bodies.

It will be apparent that the invention offers a quick means of making this determination and eliminates completely the use of almanacs, tables, calculations and other means heretofore resorted to in making such determinations.

I claim:

1. In a device of the character described, a support on which is inscribed at least one and not more than six annular areas, the inscription in each annular area comprising the sidereal time for the 24 hours of the day computed and spaced for a specific latitude in relation to the 360° of a circle, the sidereal time for the first area being positioned adjacent to the horizon of the astrological zodiac, and the sidereal time in any additional annular areas being angularly disposed from the first by one-third of the semi-nocturnal arc, two-thirds of the semi-nocturnal arc, the semi-diurnal arc, two-thirds of the semi-diurnal arc and one-third of the semi-diurnal arc therefrom, a hand for each of the annular areas movable to different radial positions of the device with a hand pointing to each of the annular areas, space provided for a horoscope containing the astrological symbols arranged with reference to each other according to their relative positions on some particular day, said horoscope being positionable near the center of said device, whereby the position of a hand will point in relation to the astrological symbols on the horoscope.

2. In a device of the character described, a support on which is inscribed at least one and not more than six annular areas, the inscription in each annular area comprising the sidereal time for the 24 hours of the day computed and spaced for a specific latitude in relation to the 360° of a circle, the sidereal time for the first area being positioned adjacent to the horizon of the astrological zodiac, and the sidereal time in any additional annular areas being angularly disposed from the first by one-third of the semi-nocturnal arc, two-thirds of the semi-nocturnal arc, the semi-diurnal arc, two-thirds of the semi-diurnal arc and one-third of the semi-diurnal arc therefrom, a hand for each of the annular areas movable to different radial positions of the device with a hand pointing to each of the annular areas, whereby when each hand is directed to a given sidereal time in the annular area, to which it points, the hands embrace arcs, a horoscope containing the astrological symbols arranged with reference to each other according to their relative positions on some particular day, said horoscope being positioned near the center of said device, whereby the arcs formed by the hands when pointed to some particular sidereal time as described will embrace a section of the horoscope.

3. In a device of the character described, a support on which is inscribed two adjacent annular areas, the inscription in each annular area comprising the sidereal time for the 24 hours of the day computed and spaced for a specific latitude in relation to the 360° of a circle so that the same sidereal time in each area is angularly disposed by one-third of the semi-nocturnal arc, two hands mounted at the center of the device, one hand pointing generally to the sidereal time in one annular area and the other hand pointing generally to the sidereal time in the other annular area, whereby when one hand is pointed to a given sidereal time in one area and the other hand is pointed to the same sidereal time in the other area the hands embrace an arc generally less than 90°, space provided for a horoscope containing the astrological symbols arranged with reference to each other according to their relative positions on some particular day, means for indexing said horoscope in the correct position in relation to the annular areas, whereby the angle formed by the two hands when pointed to some particular sidereal time as described will embrace a section of said horoscope.

4. In a device of the character described, a support on which is inscribed two adjacent annular areas, the inscription in each annular area comprising the sidereal time for the 24 hours of the day computed and spaced for a specific latitude in relation to the 360° of a circle so that the same sidereal time in each area is angularly disposed by one-third of the semi-nocturnal arc, a crossbar mounted near the center of the base and spaced from it, two hands mounted on the crossbar at the center of the device, one hand pointing generally to the sidereal time in one annular area and the other hand pointing generally to the sidereal time in the other annular area, whereby when one hand is pointed to a given sidereal time in one area and the other hand is pointed to the same sidereal time in the other area the hands embrace an arc less than 90°, a horoscope containing the astrological symbols arranged with reference to each other according to their relative positions on some particular day, said horoscope being insertable in the space between the crossbar and the base near the center of said device so as to permit different horoscopes to be used, whereby the angle formed by the hands when pointed to some particular sidereal time as described will embrace a section of said horoscope.

5. In a device of the character described, a support on which is inscribed two adjacent annular areas, the inscription in each annular area comprising the sidereal time for the 24 hours of the day computed and spaced for a specific latitude in relation to the 360° of a circle so that the same sidereal time in each area is angularly disposed by one-third of the semi-nocturnal arc, a crossbar mounted near the center of the base and spaced from it, two hands mounted on the crossbar at the center of the device, one hand pointing generally to the sidereal time in one annular area and the other hand pointing generally to the sidereal time in the other annular area, whereby when one hand is pointed to a given sidereal time in one area and the other hand is pointed to the same sidereal time in the other area the hands embrace an arc less than 90°, a horoscope containing the astrological symbols arranged with reference to each other according to their relative positions on some particular day, said horoscope being insertable in the space between the crossbar and the base near the center of said device so as to permit different horoscopes to be used, said crossbar being transparent so as not to obscure the view of the horoscope inserted in the space between the base and the crossbar, whereby the angle formed by the hands when pointed to some particular sidereal time as described will embrace a section of said horoscope.

6. In a device of the character described, a support on which is inscribed two adjacent annular areas, the inscription in each annular area comprising the sidereal time for the 24 hours of the day computed and spaced for a specific latitude in relation to the 360° of a circle so that the same sidereal time in each area is angularly disposed by one-third of the semi-nocturnal arc, a crossbar mounted near the center of the base and spaced from it, two hands mounted on the crossbar at the center of the device, one hand pointing generally to the sidereal time in one annular area and the other hand pointing generally to the sidereal time in the other annular area, whereby when one hand is pointed to a given sidereal time in one area and the other hand is pointed to the same sidereal time in the other area the hands embrace an arc less than 90°, a horoscope containing the astrological symbols arranged with reference to each other according to their relative positions on some particular day, said horoscope being formed with two extensions and being insertable in the space between the crossbar and the base near the center of said device so as to permit different horoscopes to be used, said extensions abutting the crossbar to locate the horoscope for accurate positioning with reference to the hands, whereby the angle formed by the hands when pointed to some particular sidereal time as described will embrace a section of said horoscope.

7. A device of the character described comprising means for converting any particular solar time on any particular day to sidereal time, comprising annular portions, one of which is fixed and the other movable relative thereto, on one portion is marked the 24 hours and minutes thereof of the solar day, on the other portion is marked the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

8. A device of the character described comprising means for converting any particular solar time on any particular day to sidereal time, comprising annular portions, one of which is fixed and the other movable relative thereto, on the movable portion is marked 24 hours and minutes thereof of the solar day, on the fixed portion is marked the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

9. A device of the character described comprising means for converting any particular solar time on any particular day to sidereal time, comprising annular portions, one of which is fixed and the other movable relative thereto, on one portion is marked clockwise the 24 hours and minutes thereof of the solar day, on the other portion is marked counterclockwise the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

10. A device of the character described comprising means for converting any particular solar time on any particular day to sidereal time, comprising annular portions, one of which is fixed and the other movable relative thereto, on one portion is marked clockwise the 24 hours and minutes thereof of the solar day, on the other portion is marked clockwise the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

11. A device of the character described comprising means for converting any particular solar time on any particular day to sidereal time, comprising annular portions, one of which is fixed and the other movable relative thereto, on one portion is marked counter clockwise the 24 hours and minutes thereof of the solar day, on the other portion is marked counter clockwise the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

12. A device of the character described comprising means for converting any particular solar time on any particular day to sidereal time, comprising a fixed base on which is marked the months and days of the calendar year and the sidereal time, a movable hoop on which is marked the solar time and having also a portion covering the sidereal time, a window in said covering portion located with reference to the solar time, so that when any particular time of the day is set opposite any particular day of the year, the sidereal time will appear in the window.

13. In a device of the character described, a support on which is inscribed at least one and not more than six annular areas, the inscription in each annular area comprising the sidereal time for the 24 hours of the day computed and spaced for a specific latitude in relation to the 360° of a circle the sidereal time for the first area being positioned adjacent to the horizon of the astrological zodiac, and the sidereal time in any additional annular areas being annularly disposed from the first by one-third of the semi-nocturnal arc, two-thirds of the semi-nocturnal arc, the semi-diurnal arc, two-thirds of the semi-diurnal arc and one-third of the semi-diurnal arc therefrom, a hand for each of the annular areas movable to different radial positions of the device with a hand pointing to each of the annular areas, space provided for a horoscope containing the astrological symbols arranged with reference to each other according to their relative positions on some particular day, said horoscope being positionable near the center of said device, whereby the position of a hand will point in relation to the astrological symbols on the horoscope, and means for converting any particular minute and hour of solar time on any particular day to sidereal time, comprising annular portions located outside of said annular areas, one of which is fixed and the other movable relative thereto, on one portion is marked the 24 hours and minutes thereof of the solar day, on the other portion is marked the months and days of the calendar year and the sidereal time, the position of the sidereal time to the calendar days being such that when a particular time of day on the first mentioned portion is located so as to be radially opposite a particular day of the year on the second mentioned portion, the sidereal time for the particular time of the particular day will be indicated.

14. In a device of the character described, a support on which is inscribed two adjacent annular areas, the inscription in each annular area comprising the sidereal time for the 24 hours of the day computed and spaced for a specific latitude in relation to the 360° of a circle so that the same sidereal time in each area is angularly disposed by one-third of the semi-nocturnal arc, a transparent crossbar mounted near the center of the base and spaced from it, two hands mounted on the crossbar at the center of the device, one hand pointing generally to the sidereal time in one annular area and the other hand pointing generally to the sidereal time in the other annular area, whereby when one hand is pointed to a given sidereal time in one area and the other hand is pointed to the same sidereal time in the other area the hands embrace an arc less than 90°, said space between the crossbar and base being adapted to receive a horoscope containing the astrological symbols arranged with reference to each other according to their relative positions on some particular day, said horoscope having extensions which abut the crossbar and index it in proper relation to said annular areas, whereby the angle formed by the hands when pointed to some particular sidereal time as described will embrace a section of said horoscope, and means for converting any particular minute and hour of solar time on any particular day to sidereal time, comprising an annular portion outside said annular areas on which is marked the months and days of the calendar year and the sidereal time, a movable hoop on which is marked the solar time and having also a portion covering the sidereal time, a window in said covering portion located with reference to the solar time, so that when any particular time of the day is set opposite any particular day of the year, the sidereal time will appear in the window.

MARGARET BOOTH CHERN.

REFERENCES CITED

The following references are of record in the file of this patent:

UNITED STATES PATENTS

| Number | Name | Date |
|---|---|---|
| 2,219,378 | Booth | Oct. 29, 1940 |
| 2,315,316 | Cissna | Mar. 30, 1943 |

FOREIGN PATENTS

| Number | Country | Date |
|---|---|---|
| 17,284 | Great Britain | A. D. 1889 |

Certificate of Correction

August 15, 1950

Patent No. 2,518,664

MARGARET BOOTH CHERN

It is hereby certified that error appears in the printed specification of the above numbered patent requiring correction as follows:

Column 2, line 38, for the word "positions" read *portions*; column 6, line 30, for "The area" read *In area*; line 72, for "atrological" read *astrological*; column 7, line 67, strike out "a different";

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*